Feb. 21, 1967  D. C. ADAMS  3,304,806
POSITIVE DRIVE DIFFERENTIAL GEARING
Filed May 10, 1965  3 Sheets-Sheet 1

INVENTOR:
DALE C. ADAMS
BY
ATTORNEYS.

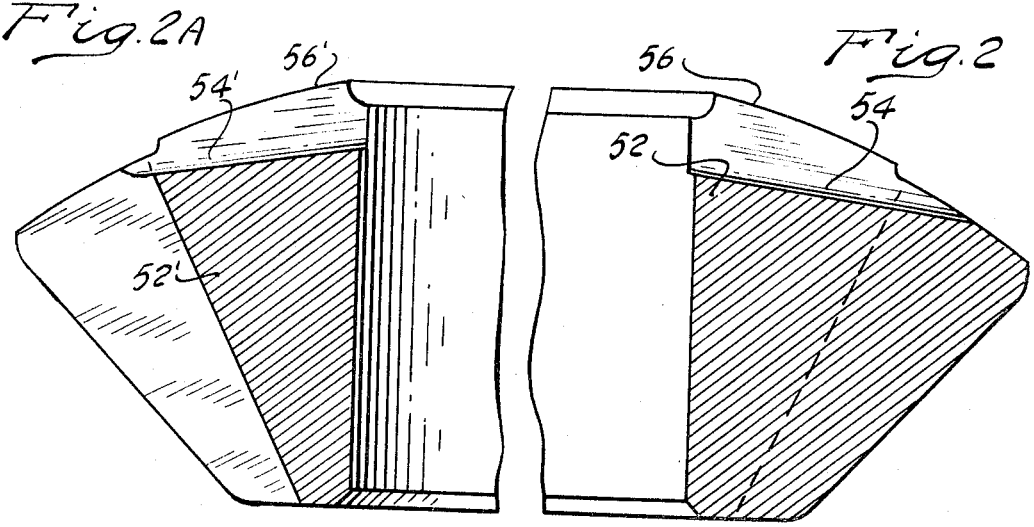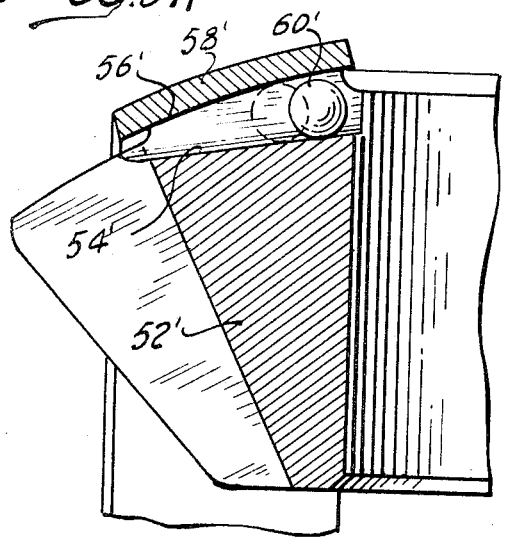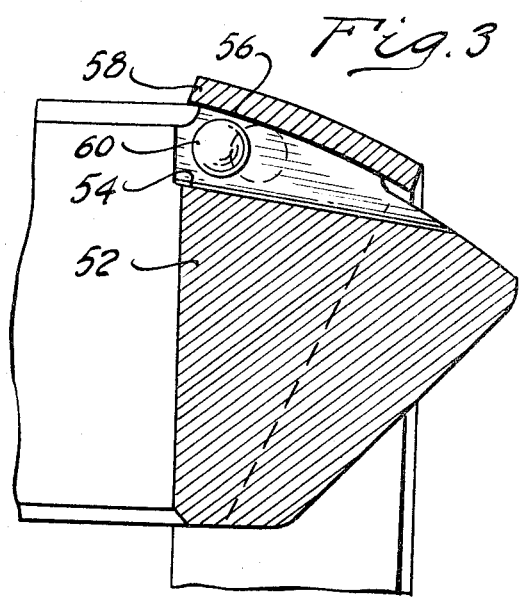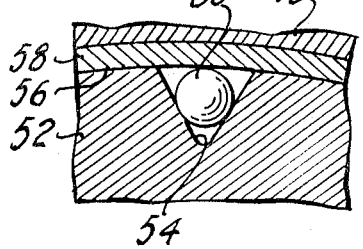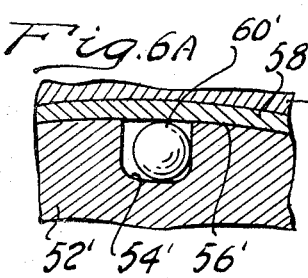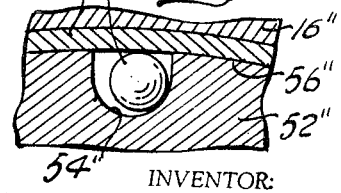

Feb. 21, 1967 D. C. ADAMS 3,304,806
POSITIVE DRIVE DIFFERENTIAL GEARING
Filed May 10, 1965
3 Sheets-Sheet 3
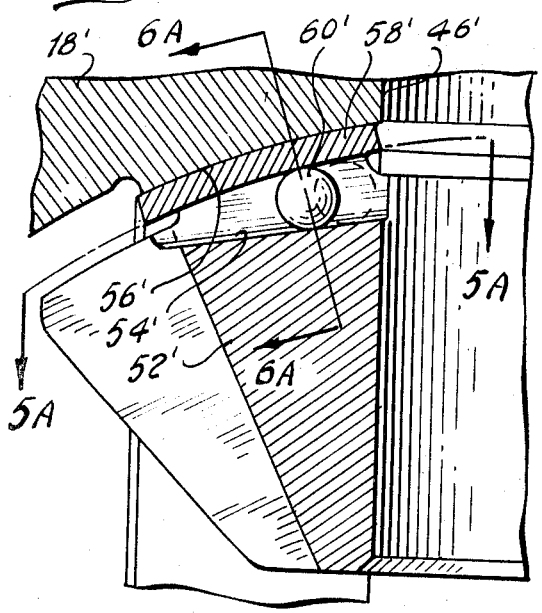
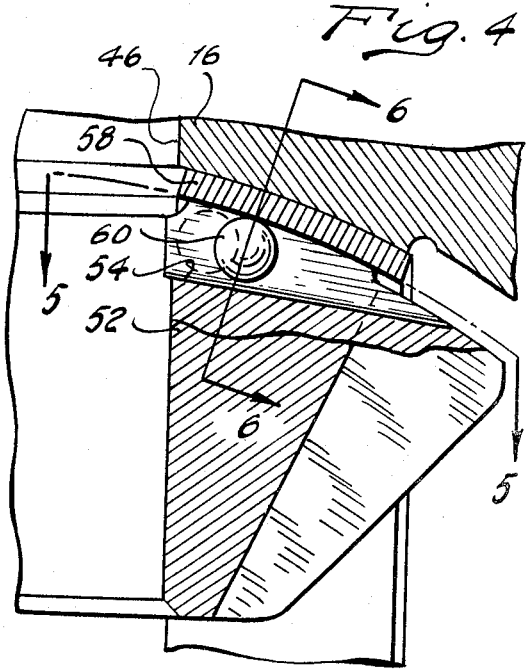
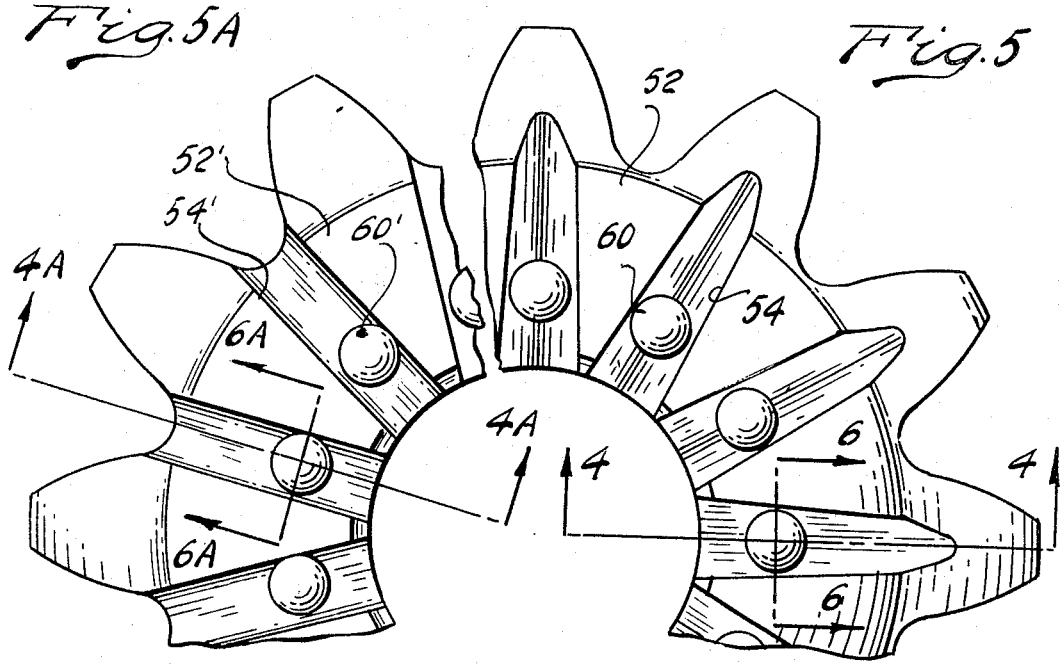
INVENTOR:
BY DALE C. ADAMS
ATTORNEYS.

United States Patent Office 3,304,806
Patented Feb. 21, 1967

3,304,806
POSITIVE DRIVE DIFFERENTIAL GEARING
Dale C. Adams, Garden City, Mich., assignor to Ford Motor Company, Dearborn, Mich., a corporation of Delaware
Filed May 10, 1965, Ser. No. 454,262
6 Claims. (Cl. 74—711)

My invention relates generally to positive traction differential gear mechanisms for use in automotive vehicle drivelines. More particularly, my invention relates to a differential gear mechanism with a centrifugally responsive lock-up clutch arrangement for establishing a torque delivery path between a driveshaft and each of two transversely disposed axle shafts.

In differential gearing used in automotive vehicle drivelines there is provided a driving pinion which is connected by means of a universal joint to one end of an engine driven driveshaft. The pinion engages a ring gear situated for rotation about an axis that is transverse to the axis of rotation of the pinion. The ring gear in turn is carried by a differential carrier within which is situated a pair of differential side gears, one side gear being connected to one axle shaft and the other side gear being connected to another axle shaft. The carrier is rotated within a differential housing for rotation about the axis of the axle shafts. A driving connection between the carrier and the side gears is established by differential pinions that are journalled for rotation in the carrier.

The differential acts to distribute driving torque from the driveshaft to each of the axle shafts during normal operation. During turning maneuvers, one axle shaft may be caused to rotate faster than the other although it continues to absorb driving torque.

A separate traction wheel is connected to each axle shaft. When one wheel loses traction, the differential carrier and the differential pinions tend to rotate freely, and the differential mechanism will be incapable of delivering driving torque due to the loss of a reaction point in the gearing. The differential pinion under such circumstances will rotate several times faster than the ring gear.

In practicing my invention I utilize the differential speeds of the ring gear and the pinions to establish a centrifugal clutch actuating force which locks together the carrier and the pinions to prevent freewheeling motion of the elements of the differential gearing as one road wheel loses traction.

The provision of a positive drive differential gear mechanism of the type above set forth is a principal object of my invention.

It is another object of my invention to provide a differential gear mechanism having centrifugally operated clutch elements situated between the differential carrier and the differential pinions, said clutch elements being effective to retard rotation of the differential pinions with respect to the carrier and to increase the friction forces acting in the differential gearing assembly. This in turn results in torque distribution to each of the traction wheels.

It is a further object of my invention to provide a positive drive differential gearing mechanism of the type above set forth and which is capable of utilizing conventional differential gear elements with no additional space being required to accommodate the centrifugally operated clutch structure.

Further objects and features of my invention will become apparent from the following description and from the accompanying drawings, wherein:

FIGURE 2 is a partial detail view in radial cross section showing a differential pinion for the assembly of FIGURE 1;

FIGURE 2A is a modified form of the pinion of FIGURE 2;

FIGURES 3 and 3A are views similar to FIGURES 2 and 2A although they include also centrifugally operated clutch elements for the pinions;

FIGURES 4 and 4A are views similar to FIGURES 3 and 3A although they show the centrifugally operated clutch elements in a different position. They are taken along the planes of section lines 4—4 and 4A—4A of FIGURES 5 and 5A, respectively;

FIGURES 5 and 5A are plan views of a portion of the pinions shown in FIGURES 3 and 3A; and FIGURES 6, 6A and 6B show different forms of grooves for the pinions of the mechanism of FIGURE 1. FIGURE 6 is taken along the plane of section line 6—6 of FIGURE 4 and FIGURE 6A is taken along the plane of section line 6A—6A of FIGURE 4A.

Figure 1:
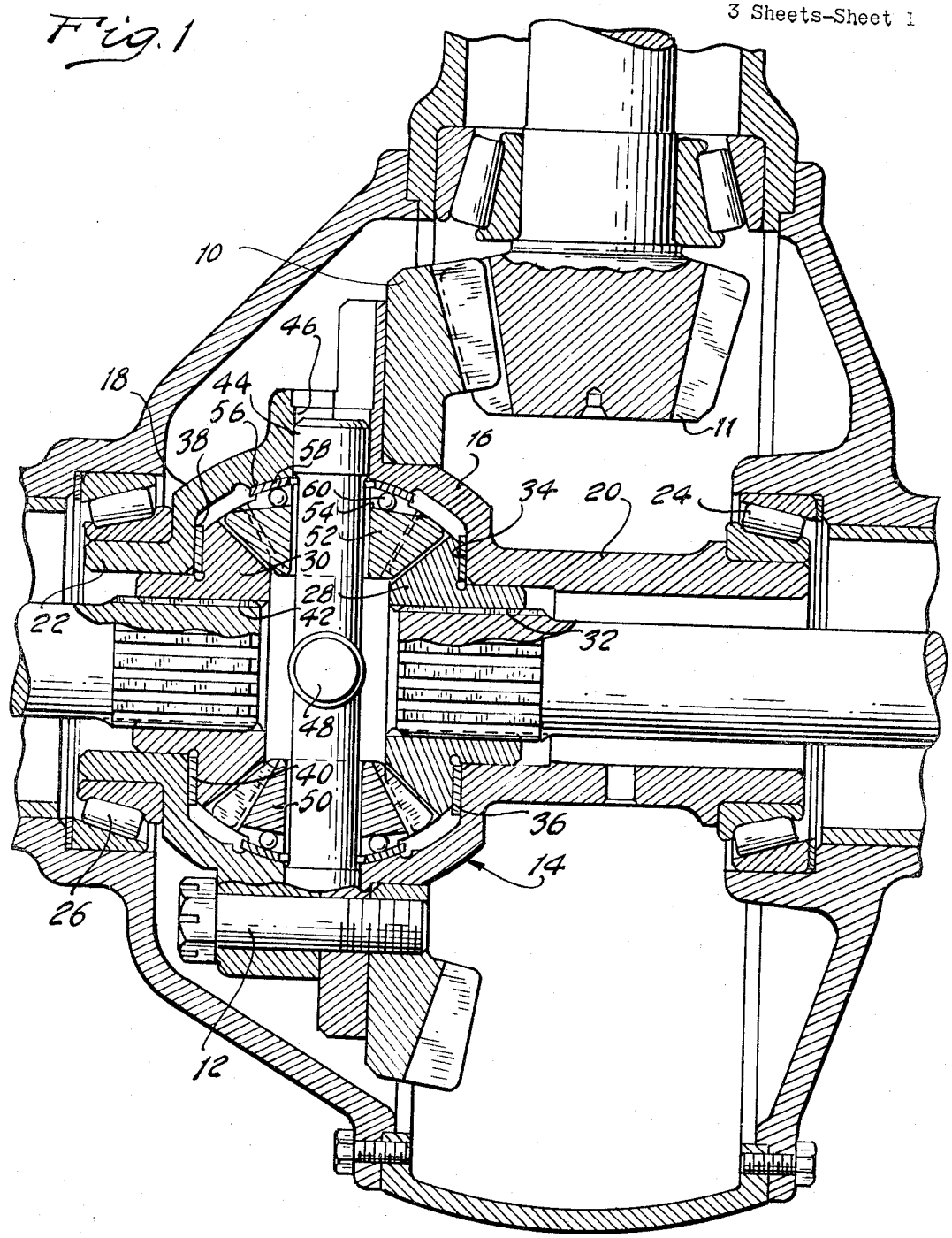
FIGURE 1 shows a partial cross-sectional assembly view of a differential gearing mechanism embodying the features of my invention.

In FIGURE 1 numeral 10 designates the ring gear of a differential gear assembly. It drivably engages in the usual fashion a differential pinion that in turn is connected by means of a universal joint to a driveshaft usually found in automotive vehicle drivelines. An example of a differential gear mechanism for use in an automotive vehicle driveline may be found in the disclosure of U.S. Patent No. 2,495,016.

Ring gear 10 is connected by means of bolts 12 to the outer periphery of a differential carrier generally indicated by reference numeral 14. The carrier includes a first part 16 and a second part 18, each part being joined together at its outer margin by bolts 12 to form a common assembly with the ring gear 10.

The carrier part 16 includes a mounting sleeve shaft 20 and the carrier part 18 includes a corresponding sleeve 22.

A first roller bearing 24 rotatably supports sleeve shaft 20 and a corresponding roller bearing 26 supports sleeve 22. The bearings 24 and 26 are received in bearing openings formed in the differential carrier housing.

The differential carrier parts 16 and 18 define an enclosure that contains a pair of differential side gears 28 and 30. Side gear 28 is internally splined at 32 to establish a splined connection with one end of an axle shaft that extends through the sleeve 20. Carrier housing part 16 is formed with a shoulder 34 which engages a cooperating shoulder formed on the gear 28. A thrust washer 36 is disposed between these shoulders.

Carrier housing part 18 is formed with a similar annular shoulder 38 which is disposed adjacent a cooperating shoulder formed on the side gear 30. A thrust washer 40 is situated between these shoulders.

Side gear 30 is internally splined at 42 to facilitate a driving connection with one end of another axle shaft that extends through the sleeve 22. Side gears 28 and 30 and their respective axle shafts, which are arranged coaxially, are transversely situated with respect to the axis of a pinion 11 which engages ring gear 10. Transversely disposed within the carrier housing 14 is a pinion shaft 44 one end of which is received within an opening 46. A corresponding pinion shaft 48 is situated also within the housing 14 in perpendicular relationship with respect to shaft 44. A pair of planetary pinions 50 and 52 is journalled for rotation about the axis of shaft 44. A corresponding pair of pinions is journalled for rotation about the axis of shaft 48. The pinions drivably engage side gears 28 and 30 as indicated. The pinions and the side gears are bevel type gears which define a right angle drive in the usual fashion.

Each of the differential pinions is similar to the others. Thus only one pinion, the pinion 52, will be described in particular.

In FIGURE 2 there is shown a radial channel 54. Several such channels can be provided. The heel of the pinion 52 is formed with a spherically crowned surface 56. This surface, as best seen in FIGURE 3, engages a corresponding concave surface of a hardened steel thrust plate 58.

Located in each of the radial channels 54 is a steel ball 60. The thrust plate 58 is formed with a central aperture to accommodate the pinion shaft 44. It encircles the axis of shaft 44 and therefore is adapted to cover each of the radial grooves. It provides a hardened cam surface on which the steel balls 60 may act.

The depth of the groovess 54 decreases progressively as the radial extent of the grooves increases. Thus the balls 60, when they move radially outwardly, become wedged between the plate 58 and the pinion 52.

The concave surface of the thrust plate 58 slopes toward the axis of the side gears 28 and 30. Thus when the differential ring gear is driven and the pinion 52 remains relatively stationary with respect to the axis of shaft 44, the steel ball 60 will be urged under the influence of centrifugal force to the position shown in FIGURE 3. This condition continues to exist during normal operation of the differential drive mechanism. Normal differential action can be accomplished as pinion 52 and the companion pinions rotate when the vehicle undergoes turning maneuvers. The speed of rotation of the pinions under these conditions is relatively slight compared to the pinion speed that is experienced when one road wheel loses traction.

In FIGURE 4 I have illustrated the position that the steel ball 60 assumes when the pinion 52 spins with respect to the shaft 44. This occurs when one traction wheel rests on ice or snow and the other traction wheel rests on a road surface with a normal friction coefficient. In this case the steel ball will be urged under the influence of the centrifugal force developed due to rotation of the pinion 52 to the wedging position shown. This causes a locking action to occur between the thrust plate 58 and the pinion 52. This causes the pinion 52 to be forced into the differential side gears 28 and 30 thereby establishing a zero backlash condition which increases the friction force. This is accompanied by torque delivery to the traction wheels as free spinning motion of the gear elements is retarded.

In FIGURES 6, 6A and 6B I have shown three types of radial grooves that may be used. Each groove is formed with a different cross sectional shape. In each case, however, the depth of the groove will decrease as the distance of any point in the groove from the axis of the pinion increases.

Having thus described the principal features of my invention, what I claim and desire to secure by U.S. Letters Patent is:

1. A positive drive differential mechanism comprising a differential carrier, a pair of differential side gears in said carrier, means for connecting each side gear to a separate driven axle shaft, a plurality of differential pinions rotatably supported by said carrier in meshing engagement with said side gears, a ring gear carried by said carrier, a plurality of radial grooves formed in each pinion, a reaction surface carried by said carrier directly adjacent said pinions and cooperating with said grooves to define radial channels, centrifugally operated clutch elements movably situated in said channels, said clutch elements being urged under the influence of centrifugal force in a radially outward direction with respect to the axis of said side gears during normal driving operation of said assembly and being urged in a radial direction with respect to the axis of said pinions when one side gear is overspeeded with respect to the other.

2. A positive traction differential gearing mechanism comprising a differential carrier, a ring gear carried by said carrier, a pair of differential side gears in said carrier, each side gear being adapted to be connected to a separate axle shaft, pinion shafts carried by said carrier, differential pinions rotatably mounted about said pinion shafts in meshing engagement with said side gears, each pinion including a crowned bearing surface, a concave reaction surface formed on said carrier in registry with each crowned pinion surface, radial grooves formed in said pinions in said surface, said reaction surface cooperating with said groove to form radially disposed channels, a steel ball located in each channel and shiftable therein from one radial position to the other with respect to the axis of said side gears, said steel balls being urged in a radially outward direction under the influence of centrifugal force during normal driving motion of said ring gear, said steel balls being urged radially outwardly with respect to the axis of said pinions when one side gear is overspeeded with respect to the other.

3. A differential gearing mechanism comprising a ring gear, a differential carrier supporting said ring gear, a pair of side gears located in said carrier in juxtaposed relationship, each side gear being adapted to be connected to a separate axle shaft, a plurality of differential pinions in said carrier in meshing engagement with said side gears, said pinions and said side gears having bevel teeth drivably engaged with each other and forming a right angle drive therebetween, a crowned bearing surface formed on each pinion, a concave thrust ring situated adjacent each bearing surface, each thrust ring being carried by said carrier, a plurality of grooves formed radially in each pinion in the bearing surface thereof, said thrust ring cooperating with said grooves to define radial channels, and a steel ball located in each channel, said steel balls being urged in a radially outward direction with respect to the axis of said side gears during normal driving motion of said ring gear, said steel balls being urged radially outwardly with respect to the axis of said pinions into wedging engagement with said thrust ring as one side gear is overspeeded with respect to the other.

4. A positive drive differential mechanism comprising a differential carrier, a pair of differential side gears in said carrier, means for connecting each side gear to a separate driven axle shaft, a plurality of differential pinions rotatably supported by said carrier in meshing engagement with said side gears, a ring gear carried by said carrier, a plurality of radial grooves formed in each pinion, a reaction surface carried by said carrier directly adjacent said pinions and cooperating with said grooves to define radial channels, centrifugally operated clutch elements movably situated in said channels, said clutch elements being urged under the influence of centrifugal force in a radially outward direction with respect to the axis of said side gears during normal driving operation of said assembly, each side gear having an annular reaction shoulder, an annular reaction surface formed on said carrier adjacent each shoulder of said side gears, a thrust washer located between each annular shoulder and the reaction surface of said carrier that cooperates therewith, said pinions being urged into said side gears to establish a zero backlash high friction driving condition when one side gear is speeded up with respect to the other.

5. A positive traction differential gearing mechanism comprising a differential carrier, a ring gear carried by said carrier, a pair of differential side gears in said carrier, each side gear being adapted to be connected to a separate axle shaft, pinion shafts carried by said carrier, differential pinions rotatably mounted about said pinion shafts in meshing engagement with said side gears, each pinion including a crowned bearing surface, a concave reaction surface formed on said carrier in registry with each crowned pinion surface, radial grooves formed in said pinions in said surface, said reaction surface cooperating with said grooves to form radially disposed channels, a steel ball located in each channel and shiftable therein from one radial position to the other with respect to the axis of said side gears, said steel balls being urged in a radially outward direction under the influence of centrifugal force during normal driving motion of said ring gear, each side gear having an annular reaction shoulder, an annular reaction surface formed on said carrier adjacent each shoulder of said side gear, and a thrust washer located between each annular shoulder and the reaction surface of said carrier that cooperates therewith, said pinions being urged into said side gears to establish a zero backlash high friction driving condition when one side gear is speeded up with respect to the other.

6. A differential gearing mechanism comprising a ring gear, a differential carrier supporting said ring gear, a pair of side gears located in said carrier in juxtaposed relationship, each side gear being adapted to be connected to a separate axle shaft, a plurality of differential pinions in said carrier in meshing engagement with said side gears, said pinions and said side gears having bevel teeth drivably engaged with each other and forming a right angle drive therebetween, a crowned bearing surface formed on each pinion, a concave thrust ring situated adjacent each bearing surface, each thrust ring being carried by said carrier, a plurality of grooves formed radially in each pinion in the bearing surface thereof, said thrust ring cooperating with said grooves to define radial channels, a steel ball located in each channel, said steel balls being urged in a radially outward direction with respect to the axis of said side gears during normal driving motion of said ring gear, each side gear having an annular reaction shoulder, an annular reaction surface formed on said carrier adjacent each shoulder of said side gear, and a thrust washer located between each annular shoulder and the reaction surface of said carrier that cooperates therewith, said pinions being urged into said side gears to establish a zero backlash high friction driving condition when one side gear is speeded up with respect to the other.

References Cited by the Examiner
UNITED STATES PATENTS

| | | | |
|---|---|---|---|
| 1,324,857 | 12/1919 | Taylor | 74—711 X |
| 1,988,183 | 1/1935 | Whitcomb | 74—711 |
| 2,354,214 | 7/1944 | Lockwood | 74—711 |
| 2,985,035 | 5/1961 | Toth | 74—711 |

DAVID J. WILLIAMOWSKY, *Primary Examiner.*

J. A. WONG, *Assistant Examiner.*